(12) United States Patent
Jordan et al.

(10) Patent No.: US 9,913,087 B2
(45) Date of Patent: Mar. 6, 2018

(54) MOBILE ASSET CELLULAR DEVICE TRANSMISSION DETECTION SYSTEM AND METHOD

(71) Applicant: Wi-Tronix, LLC, Bolingbrook, IL (US)

(72) Inventors: Lawrence B. Jordan, Bolingbrook, IL (US); Michael Heilmann, Bolingbrook, IL (US); Lisa A. Matta, Bolingbrook, IL (US); Michael Schmidt, Bolingbrook, IL (US)

(73) Assignee: Wi-Tronix, LLC, Bolingbrook, IL (US)

( * ) Notice: Subject to any disclaimer, the term of this patent is extended or adjusted under 35 U.S.C. 154(b) by 0 days.

(21) Appl. No.: 15/473,870

(22) Filed: Mar. 30, 2017

(65) Prior Publication Data
US 2017/0208435 A1    Jul. 20, 2017

Related U.S. Application Data

(63) Continuation of application No. 14/481,290, filed on Sep. 9, 2014, now Pat. No. 9,648,456.
(Continued)

(51) Int. Cl.
| | |
|---|---|
| *H04W 24/00* | (2009.01) |
| *H04W 4/02* | (2018.01) |
| *H04W 4/04* | (2009.01) |
| *G01S 5/00* | (2006.01) |
| *G01S 5/02* | (2010.01) |
| *G01S 19/13* | (2010.01) |

(52) U.S. Cl.
CPC .......... *H04W 4/021* (2013.01); *G01S 5/0027* (2013.01); *G01S 5/021* (2013.01); *G01S 19/13* (2013.01); *H04W 4/046* (2013.01); *G01S 2205/002* (2013.01)

(58) Field of Classification Search
CPC ....... H04W 4/021; H04W 4/046; G01S 19/13; G01S 5/021; G01S 5/0027; G01S 2205/002
USPC ........................................................ 455/456.1
See application file for complete search history.

(56) References Cited

U.S. PATENT DOCUMENTS

| | | | |
|---|---|---|---|
| 2002/0177476 A1 | 11/2002 | Chou | |
| 2008/0014897 A1* | 1/2008 | Cook | H02J 17/00 455/343.1 |

(Continued)

*Primary Examiner* — Tanmay Shah
(74) *Attorney, Agent, or Firm* — Mercedes V. O'Connor; Howard B. Rockman; Rockman Videbeck & O'Connor (57) ABSTRACT

A mobile asset cellular device transmission detector system and method comprises a mobile asset cellular device transmission detector, a wireless processing unit, an event recorder, and a digital video recorder. The wireless processing unit includes event recorder interface software, digital video recorder interface software that obtains data from the digital video recorder, wireless navigation (Wi-Nav) software that obtains data from the Wi-Nav, global positioning system (GPS) software that obtains data from a GPS and geo-fence software. The cellular device transmission detector continually checks for cellular device transmissions within a mobile asset and whether those transmissions were associated with an impact, rollover, operator action or geofence defined location and/or boundary. When a cellular device transmission was made, the wireless processing unit triggers an episode and sends event recorder information, GPS location and speed, audio and video recordings, and impact and rollover information to a back office.

16 Claims, 5 Drawing Sheets

Related U.S. Application Data (60) Provisional application No. 61/875,737, filed on Sep. 10, 2013.

(56) References Cited

U.S. PATENT DOCUMENTS

| | | |
|---|---|---|
| 2009/0085728 A1 | 4/2009 | Catten et al. |
| 2009/0275281 A1* | 11/2009 | Rosen .................... H04K 3/415 455/1 |
| 2012/0015690 A1 | 1/2012 | Miao |
| 2012/0028680 A1* | 2/2012 | Breed ..................... B60C 11/24 455/556.1 |
| 2013/0238366 A1 | 9/2013 | Morgan et al. |
| 2015/0112581 A1* | 4/2015 | Hakim ............... G01C 21/3461 701/400 |

\* cited by examiner

MOBILE ASSET CELLULAR DEVICE TRANSMISSION DETECTION SYSTEM AND METHOD

CROSS-REFERENCE TO RELATED APPLICATION(S)

This application claims priority to U.S. Provisional Application No. 61/875,737, filed Sep. 10, 2013, and claims priority to and is a continuation of U.S. Non-provisional application Ser. No. 14/481,290, filed Sep. 9, 2014, to the extent allowed by law and the contents of which are incorporated herein by reference in their entireties.

TECHNICAL FIELD

This disclosure relates to equipment used in mobile assets and particularly, to cellular device detection systems used in high value mobile assets.

BACKGROUND

Mobile assets such as locomotives, mining equipment, cargo, marine and military vehicles and vessels typically employ an onboard data acquisition and logging device, similar to a "black box" on airplanes. A typical onboard data acquisition and logging device, or an event/data recorder, comprises digital and analog inputs as well as pressure switches and transducers which record data from various onboard sensor devices. These event/data recorders log a variety of system parameters used for incident investigation, crew performance evaluation, fuel efficiency analysis, maintenance planning, and predictive diagnostics. Recorded data may include such parameters as speed, distance traveled, location, fuel level, engine revolutions per minute (RPM), fluid levels, operator controls, pressures, and temperature conditions. In addition to the basic event and operational data, video, still image and audio event/data recording capabilities are also deployed on many of these same mobile assets. The data recorded onboard a mobile asset, wirelessly transmitted offboard can be triggered, prioritized and filtered based on the detection of cellular device usage.

SUMMARY

This disclosure relates generally to a mobile asset cellular device transmission detection system and method used in high value mobile assets. The teachings herein provide detection of any type of transmission of a mobile or cellular device onboard a mobile asset. One implementation of a method for detecting operation of a cellular device onboard a mobile asset described herein includes detecting radio frequency energy, using one of a directional and an omni-directional antenna, produced by the cellular device based onboard the mobile asset; continually checking a transmission status of the cellular device based on the radio frequency energy, detected by the antenna, using a cellular device transmission detector onboard the mobile asset; and receiving an operating indication indicative of a first condition of the cellular device, using a wireless processing unit onboard the mobile asset, from the cellular device transmission detector on a second condition that the transmission status indicates that the first condition of the cellular device is operating.

One implementation of a system for detecting operation of a cellular device onboard a mobile asset described herein includes one of a directional and an omnidirectional receiving antenna configured to detect radio frequency energy produced by the cellular device onboard the mobile asset and communicate with a wireless processing unit onboard the mobile asset; a cellular device transmission detector onboard the mobile asset, the cellular device transmission detector configured to communicate with the antenna and the wireless processing unit and continually check a transmission status of the cellular device based on the radio frequency energy detected by the antenna; and a wireless processing unit onboard the mobile asset, the wireless processing unit configured to communicate with the cellular device transmission detector and receive an operating indication indicative of a first condition of the cellular device from the cellular device transmission detector on a second condition that the transmission status indicates that the first condition of the cellular device is operating.

These and other aspects of the present disclosure are disclosed in the following detailed description of the embodiments, the appended claims and the accompanying figures.

BRIEF DESCRIPTION OF THE DRAWINGS

The various features, advantages, and other uses of the system and method will become more apparent by referring to the following detailed description and drawings, wherein like reference numerals refer to like parts throughout several views. It is emphasized that, according to common practice, the various features of the drawings are not to-scale. On the contrary, the dimensions of the various features are arbitrarily expanded or reduced for clarity.

DETAILED DESCRIPTION

A mobile asset cellular device detection system and method of an embodiment of the present disclosure is used on mobile assets to detect a transmitting mobile or cellular device in the cab of the mobile asset. The system comprises the integration of four components: an event data recorder (ER), similar to a "black box" on airplanes; a locomotive digital video recorder (LDVR); a wireless processing unit (Wi-PU; and a cellular device transmission detector and antenna. The antenna comprises one of a directional and an omnidirectional receiving antenna within the mobile asset. The Wi-PU includes two further components, a wireless navigation (Wi-Nav) and a global positioning system (GPS).

The Wi-PU also includes software that receives ER information, LDVR recordings, Wi-Nav information, GPS information, and geo-fence information. The ER information can include throttle position, brake pressures, wheel speed, emergency brake application, and horn and bell operation. The LDVR provides audio, still image, and/or video recordings using onboard recording systems with one or multiple video, still image, and audio capture devices that monitor forward facing, rear facing, and in-cab regions of the mobile asset. The LDVR also provides audio, still image, and/or video recordings using onboard recording systems with one or multiple video, still image, and audio capture devices that monitor forward facing, rear facing, and in-cab regions of a mobile asset nearby or adjacent to the mobile asset within which the transmitting mobile or cellular device was detected. The LDVR further provides audio, still image, and/or video recordings using onboard recording systems with one or multiple video, still image, and audio capture devices with recording equipment from a fixed site nearby or adjacent to the mobile asset within which the transmitting mobile or cellular device was detected.

The GPS information can include the mobile asset's location, in latitude and longitude, heading, elevation and speed. The system utilizes the GPS location data to precisely locate the mobile asset at any time, including at a time of transmitting cellular device detection. The Wi-Nav information can include impact detection and rollover detection, thereby providing automatic collision detection and/or rollover detection during or within a configurable period of time after detection of a transmitting cellular device. Wi-Nav information can also include accelerometer data for dead reckoning location when GPS data is unavailable.

The geo-fence information provides user-defined geo-fence geographical locations, regions, and/or boundaries where mobile or cellular device detection is disabled, enabled, or otherwise controlled. Additionally, user-defined rule sets, based on regulatory, statutory, government, business, operational and/or safety requirements, may be included that define where mobile or cellular device detection is disabled, enabled, or otherwise controlled. The user-defined rule sets may also be used in conjunction with the user-defined geo-fences to define where mobile or cellular device detection is disabled, enabled, or otherwise controlled.

The cellular device transmission detector, can detect cellular devices that are powered on and transmitting, that includes when a cellular device within the mobile asset is being used to place a phone call, answer a phone call, send a text message, receive a text message, and any other data transmission such as email updates and browsing the internet. The cellular device transmission detector can also detect the operation of a portable cellular based Wi-Fi hotspot device. The user can also set a geo-fence area where cellular device usage is turned off or turned on, if the mobile asset is moving, stopped, or regardless of whether the mobile asset is moving.

Figure 1:
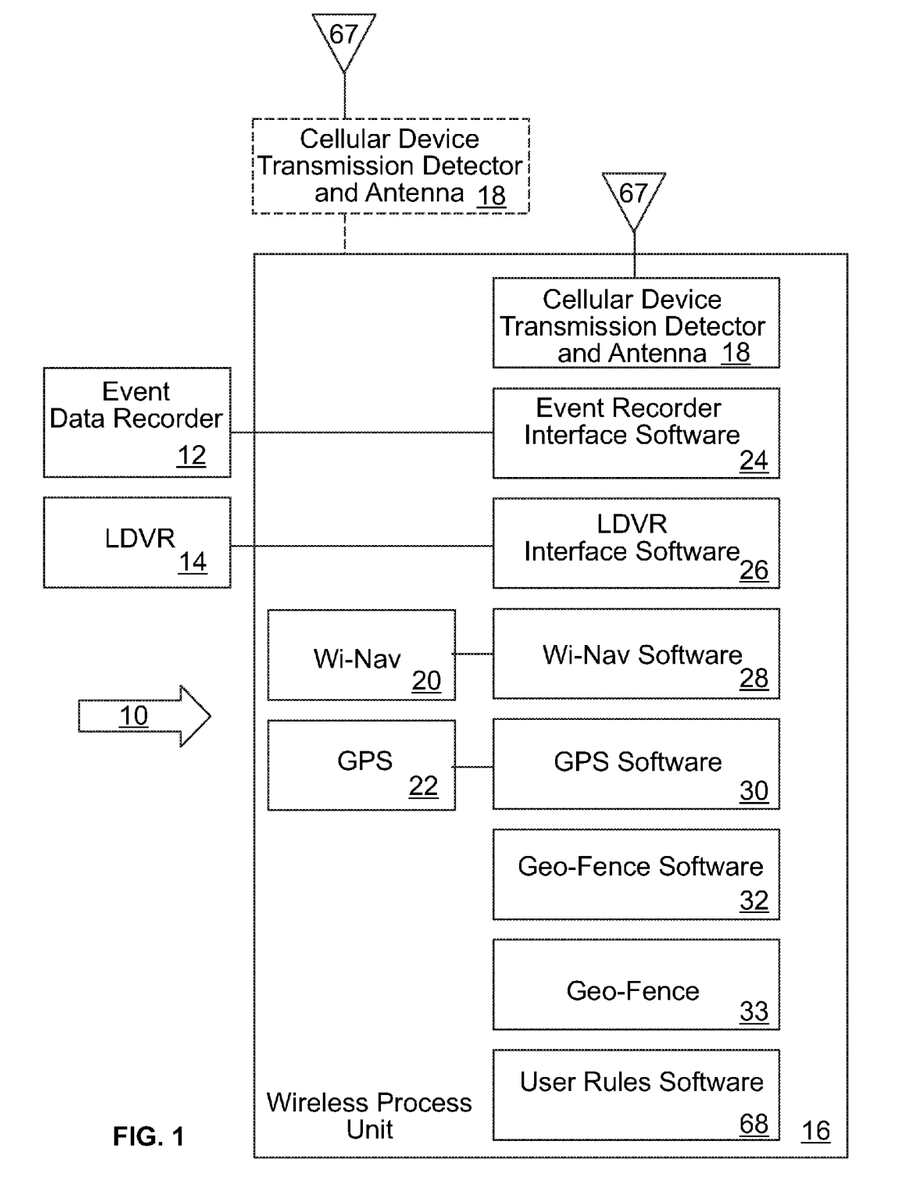
FIG. 1 is a diagram showing system components of an embodiment of a mobile asset cellular device transmission detector of the present disclosure.

The mobile asset cellular device transmission detection system and method of the present disclosure and its components are shown in FIG. 1. The mobile asset cellular device transmission system 10 consists of five interrelated components: an event data recorder (ER) 12, a locomotive digital video recorder (LDVR) 14, a wireless processing unit (Wi-PU) 16, and a cellular device transmission detector 18 and antenna. The cellular device transmission detector 18 can be within the Wi-PU 16 or outside of the Wi-PU 16. A wireless navigation (Wi-Nav) 20 component and a global positioning system (GPS) component 22 are within the Wi-PU 16. The Wi-PU 16 also includes ER 12 interface software 24, LDVR 14 interface software 26, Wi-Nav 20 software 28, GPS 22 software 30, geo-fence software 32 and user rules software 68. Installing the Wi-PU 16 onto an asset, such as a locomotive, consists of mounting the Wi-PU 16 with an external or internal cellular device transmission detector 18, and connecting it externally to an ER 12, an LDVR 14, a directional or omni-directional receiving antenna 67 and any additional available condition sensing devices.

The ER 12, similar to a black-box on airplanes, is an onboard data logging device for locomotives. A typical ER 12 comprises digital and analog inputs as well as pressure switches and pressure transducers that record data from various onboard devices, such as throttle position, brake pressures, emergency brake application, and horn and bell application. The Wi-PU 16 receives and processes data from the ER 12 once per second over an external serial connection.

The LDVR 14, similar to a television DVR, is an onboard audio, still image and/or video recording device. The LDVR 14 comes equipped with a forward facing camera and may also include an in-cab facing camera, a rear facing camera, and microphones. The cameras are mounted at such orientations that they see and record what the engineer sees and the cab environment. The Wi-PU 16 accesses the LDVR 14 via an external Ethernet connection to download the audio, still image and/or video from the hard drive before, during, and after an event, such as when the cellular device transmission detector 18 detects that a cellular device is powered on and transmitting.

The Wi-PU 16 can use the geo-fence software 32 to set a geo-fence 33 that defines a geographic location, region or boundary within which the cellular device transmission detector 18 is to check for transmission or disregard a transmission detection. The geo-fence can be configurable to certain geographic locations 33. The geo-fence 33 can geographically define locations where cellular device detection is disabled, enabled or otherwise controlled.

The Wi-PU 16 can use the user rules software 68 to define specific rules under which the cellular device transmission detector 18 is to check for transmission or disregard a transmission detection. The user rules 68 define regulatory, statutory, government, business, operational or safety requirements where cellular device detection is disabled, enabled or otherwise controlled.

The Wi-PU 16 of the illustrated embodiment is a ruggedized onboard computer running Windows XP or a similar operating system embedded specifically for industrial applications. It has many different features that can be installed to customize the product for specific customer needs. The Wi-PU 16 has the ability to communicate with a wide variety of onboard systems, including, but not limited to, vehicle control systems, event data recorders, LDVRs, cellular device transmission detectors, and engine controllers. The Wi-PU 16 has the ability to communicate over a wide variety of protocols, including, but not limited to, RS 232, RS 422, RS 485, CAN Bus, Ethernet, WiFi, cellular, and satellite.

The cellular device transmission detector 18, as is known in the art, can be an internal or external component of the Wi-PU 16. The cellular device transmission detector 18 detects several frequencies. In North America, the cellular device transmission detector 18 detects 1850-1910 MHz (PCS), 824-849 MHz (CDMA), 896-901 MHz (GSM), and 700 MHz (LTE). The cellular device transmission detector 18 has an adaptive sensitivity and can be optimized for the particular model of locomotive it is to be used on. The cellular device transmission detector 18 can be used with either a directional or omnidirectional receiving antenna 67.

Figure 2:
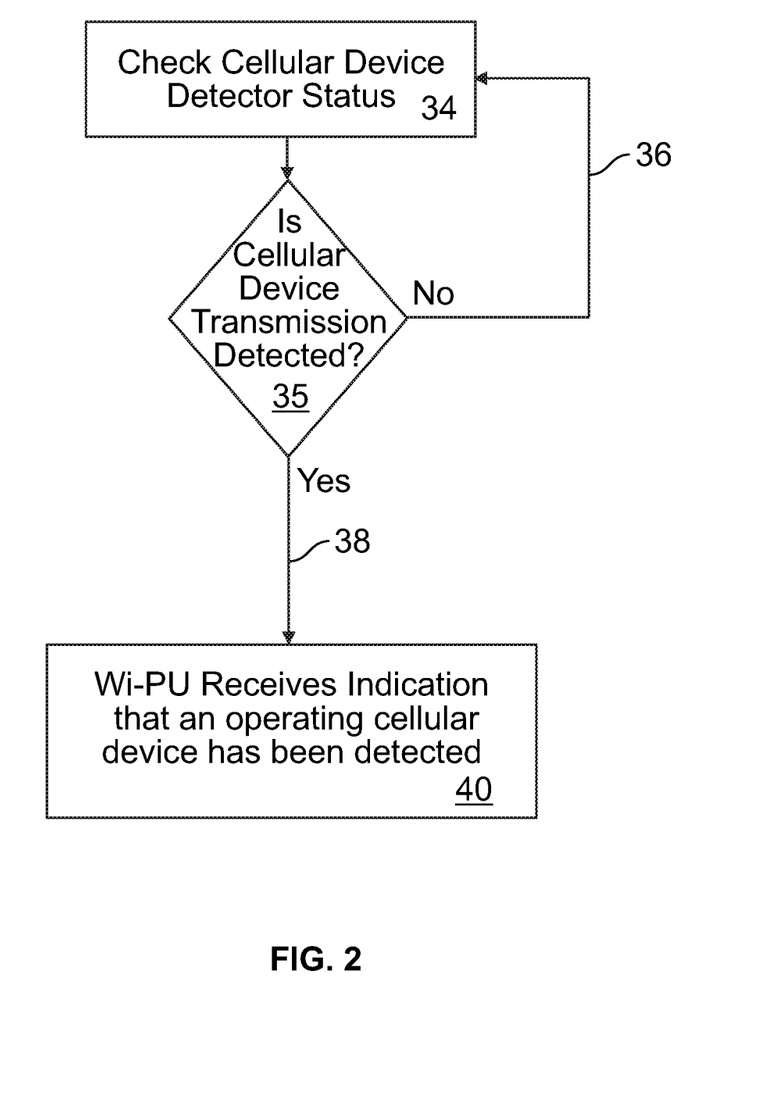
FIG. 2 is a flow diagram showing when a cellular device transmission is detected in the present disclosure.

FIG. 2 is a flow diagram showing when a cellular device transmission is detected in the present disclosure. The cellular device transmission detector 18 (FIG. 1) continually checks the cellular device transmission status 34 as received using the in cab antenna 67 (FIG. 1), checking if the cellular device is powered on and/or transmitting a signal 35. If the cellular device is not powered on and/or is not transmitting a signal 36, then the cellular device transmission detector continues to check the status 34. If the cellular device is powered on and/or is transmitting a signal 38, the cellular device transmission detector 18 alerts the Wi-PU 16 of the signal detection 40. The cellular device transmission detector 18 will detect cellular transmissions within the cab of a mobile asset. Transmissions include placing a phone call, answering a phone call, sending a text message, receiving a text message, any data transmission (email updates, browsing the internet, etc.), and the operation of a portable cellular based Wi-Fi hotspot.

Figure 3:
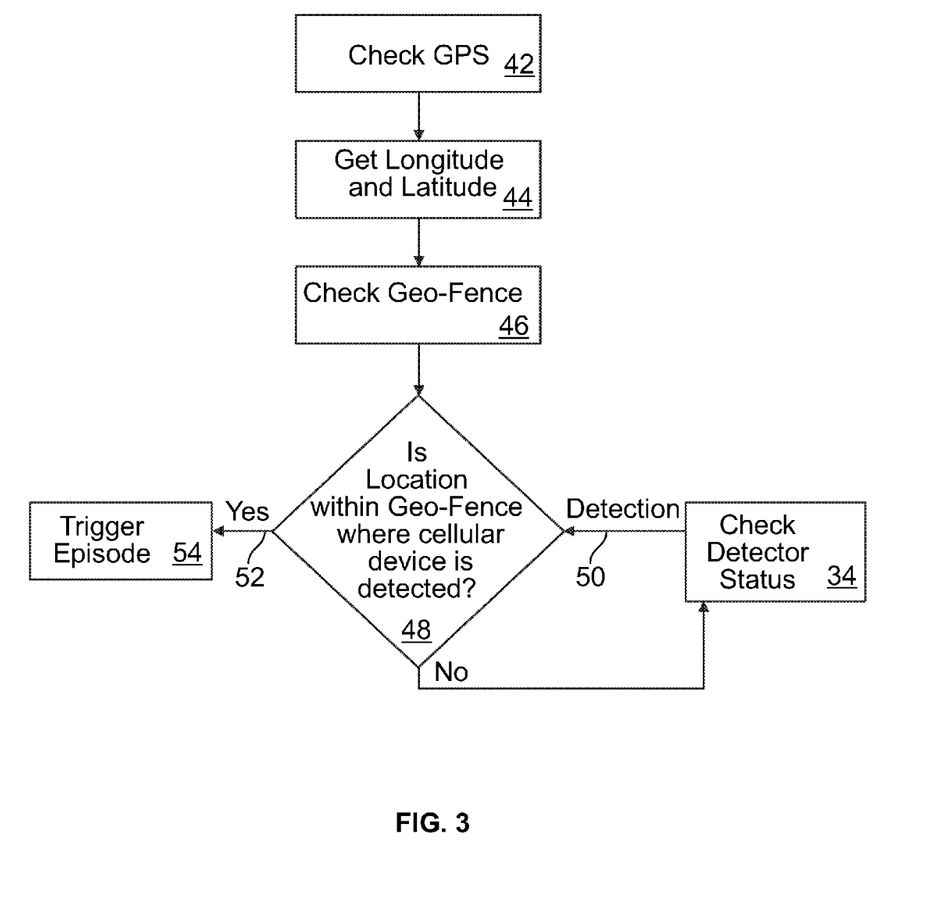
FIG. 3 is a flow diagram showing a wireless processing unit checking a GPS onboard a mobile asset.

FIG. 3 is a flow diagram showing when a cellular device transmission has been detected. Once the Wi-PU 16 (FIG. 1) is alerted that a signal has been detected, the GPS software 30 (FIG. 1) checks the GPS 42 and obtains the mobile asset's location in latitude and longitude 44. If GPS location data is not available, the Wi-PU 16 uses dead reckoning to determine the location in latitude and longitude 44 of the mobile asset. Dead reckoning is the process of calculating a current position by using a previously determined position, or fix, and advancing that position based upon known or estimated speeds over elapsed time and course. In dead reckoning mode, the last known latitude and longitude are obtained from the GPS 42 and stored. A new position for the mobile asset is calculated using the last known latitude and longitude along with the asset's speed, the wheel speed from the event recorder information, the tilt compensated heading and the data from the 3-axis gyroscope. The new latitude and the new longitude are stored and used, and the process continues until valid GPS data is available again. When the Wi-Pu 16 has latitude and longitude coordinates, the Wi-PU 16 then checks the geo-fence 46 and determines whether the location of the mobile asset is within that geo-fence 46 and whether the cellular device detection is disabled, enabled or otherwise controlled. If the location of the mobile asset is within the geo-fence 46 and cellular device detection 50 is not enabled within that geo-fence 48, the cellular device transmission detector 18 continues to check detector status 34 (FIG. 2). If the location of the mobile asset is within the geo-fence 46 and cellular device detection is enabled 52 or otherwise controlled, the Wi-PU 16 triggers an episode 54.

Figure 4:
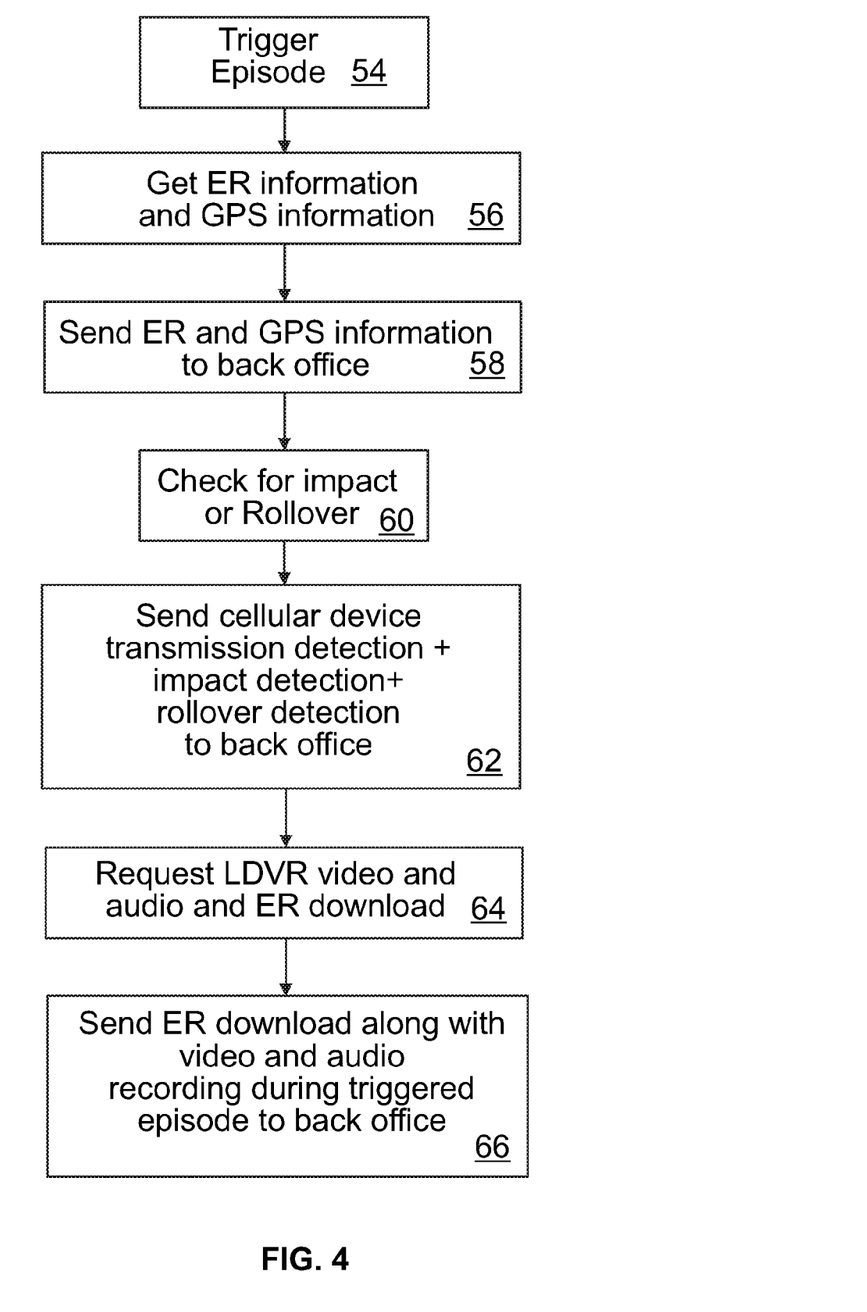
FIG. 4 is a flow diagram showing when a trigger episode has been detected within a geo-fence where cellular device transmission detection is enabled.

FIG. 4 is a flow diagram showing when a trigger episode 54 has been detected. When a trigger episode 54 has been detected, the ER information software 24 (FIG. 1) checks the ER information and the GPS software 30 (FIG. 1) checks the GPS and obtains the mobile asset's location in latitude and longitude, heading and speed 56. The Wi-PU 16 then sends the ER information and the GPS 22 location to the back office 58. The ER information can include throttle position, brake pressure, emergency brake application, horn and bell application. The Wi-PU 16 then checks the Wi-Nav software 28 and determines whether an impact and/or a rollover occurred 60. The Wi-PU 16 will then send the back office information on whether cellular device transmission was detected, cellular device transmission was detected with an impact, and/or cellular device transmission was detected with a rollover 62. The Wi-PU 16 will also check the LDVR software 26 (FIG. 1) to obtain audio, still image and/or video recordings 64 of the trigger episode 54, along with downloaded event recorder data, and will send the audio/still image/video recording from the LDVR 14 and the event recorder data downloaded from the ER 12 for the time of the trigger episode 54 to the back office 66.

The back office uses the GPS 22 location information to determine other nearby or adjacent mobile assets and fixed sites equipped with an LDVR 14. The back office requests and receives audio, still image and/or video data from an adjacent mobile asset's Wi-PU 16 or fixed sites with LDVR software 26.

The back office uses the GPS 22 location information to determine other nearby or adjacent fixed sites equipped with an LDVR 14. The back office requests and receives still image and/or video data from the fixed site LDVRs 14.

Figure 5:
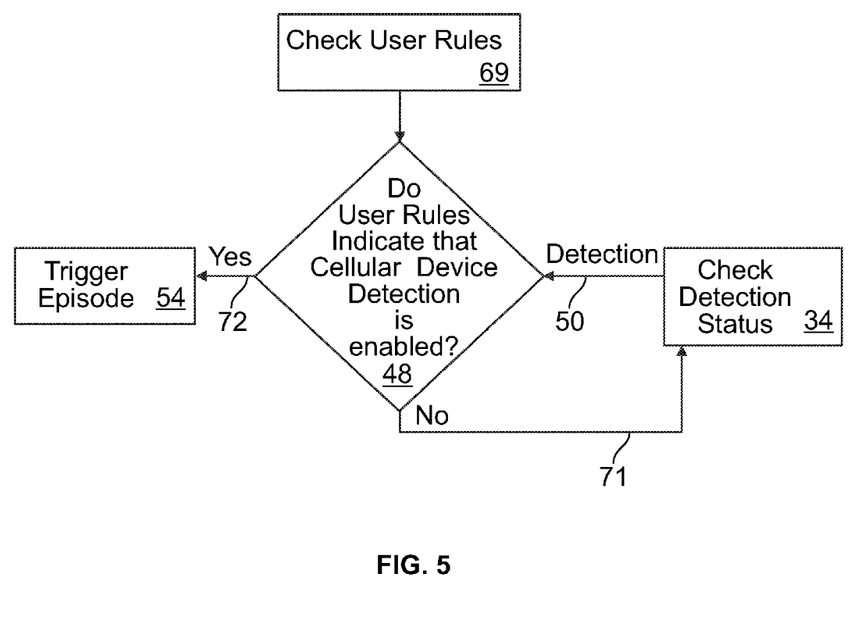
FIG. 5 is a flow diagram showing when a trigger episode has been detected and user defined rules indicate that cellular device transmission detection is enabled.

FIG. 5 is a flow diagram showing when cellular device transmission has been detected. Once the Wi-PU 16 (FIG. 1) is alerted that a signal has been detected, the Wi-PU checks the user defined rules 69 to determine whether the cellular device detection is disabled, enabled or otherwise controlled 70. If the user defined rules indicate that cellular device detection is not enabled 71, the cellular device transmission detector 18 continues to check detector status 34 (FIG. 2). If the user defined rules indicate that cellular device detection is enabled 72 or otherwise controlled, the Wi-PU 16 triggers an episode 54.

While the present disclosure has been described in connection with certain embodiments, it is to be understood that the present disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system for detecting operation of a cellular device onboard a mobile asset, comprising:
   one of a directional and an omnidirectional receiving antenna configured to detect radio frequency energy produced by the cellular device onboard the mobile asset and communicate with a wireless processing unit onboard the mobile asset;
   a cellular device transmission detector onboard the mobile asset, the cellular device transmission detector configured to communicate with the antenna and the wireless processing unit and continually check a transmission status of the cellular device based on the radio frequency energy detected by the antenna; and
   a wireless processing unit onboard the mobile asset, the wireless processing unit configured to communicate with the cellular device transmission detector and receive an operating indication indicative of a first condition of the cellular device from the cellular device transmission detector on a second condition that the transmission status indicates that the first condition of the cellular device is operating.

2. The system of claim 1, wherein operating comprises at least one of powered on, transmitting a signal, placing a phone call, answering a phone call, sending a text message, receiving a text message, transmitting data, and operating a portable cellular based wi-fi hotspot.

3. The system of claim 1, wherein the transmission status includes at least one of the cellular device is powered on, the cellular device is powered off, the cellular device is transmitting a signal, and the cellular device is receiving a signal.

4. The system of claim 1, further comprising:
   a global positioning system software application configured to check a global positioning system (GPS) within the wireless processing unit onboard the mobile asset, the global positioning system software application configured to obtain GPS data from the GPS;

a geo-fence software application within the wireless processing unit, the geo-fence software application configured to communicate with the wireless processing unit and determine a predetermined geo-fence area; and the wireless processing unit configured to:
determine a location of the mobile asset based on the GPS data received from the GPS on a condition that the GPS data is available from the GPS;
determine a location of the mobile asset based on dead reckoning on a condition that the GPS data is not available from the GPS;
comparing the location to the predetermined geo-fence area; and
triggering an episode at a time when the location is within the predetermined geo-fence area and cellular device transmission detection is one of enable and controlled within the predetermined geo-fence area.

5. The system of claim 4, wherein the location of the mobile asset includes latitude and longitude coordinates.

6. The system of claim 4, further comprising:
at least one event data recorder onboard the mobile asset, the at least one event data recorder configured to receive, using an event data recorder interface software application, event data recorder information recorded at at least one of the time of the episode and near the time of the episode;
a digital video recorder onboard the mobile asset, the digital video recorder configured to record at least one of a first audio recording, a first still image recording, and a first video recording recorded at at least one of the time of the episode and near the time of the episode and communicate with the wireless processing;
a digital video recorder interface software application within the wireless processing unit, the digital video recorder interface software application configured to communicate with the digital video recorder;
a wireless navigation within the wireless processing unit, the wireless navigation configured to detect, using a wireless navigation software application, at least one of an impact indication on a condition that an impact occurred with the mobile asset and a rollover indication on a condition that a rollover occurred with the mobile asset;
the wireless processing unit configured to:
send the event data recorder information and the GPS data to a back office;
detect at least one of the operating indication, the operating indication and the impact indication involving the mobile asset, and the operating indication and the rollover indication involving the mobile asset;
send at least one of the operating indication, the operating indication and the impact indication, and the operating indication and the rollover indication to the back office;
request at least one of the first audio recording, the first still image recording, and the first video recording from the digital video recorder; and
send at least one of the event data recorder information and at least one of the first audio recording, the first still image recording, and the first video recording to the back office.

7. The system of claim 6, wherein the GPS data includes at least one of the location, a heading, and a speed of the mobile asset.

8. The system of claim 7, wherein the location of the mobile asset includes latitude and longitude.

9. The system of claim 6, wherein the back office is configured to use the GPS data to locate at least one of an adjacent mobile asset and an adjacent fixed site.

10. The system of claim 9, wherein the back office is configured to request and receive at least one of a second audio recording, a second still image recording, and a second video recording from at least one of the adjacent mobile asset and the adjacent fixed site.

11. The system of claim 6, wherein the event data recorder information comprises at least one of throttle position, brake pressure, emergency brake application, horn application, and bell application of the mobile asset.

12. The system of claim 6, further comprising:
at least one of a forward facing camera, an in-cab camera, a rear facing camera, and a microphone, the forward facing camera, the in-cab camera, the rear facing camera, and the microphone configured to communicate with the digital video recorder and provide the first audio recording, the first still image recording, and the first video recording to the digital video recorder.

13. The system of claim 4, wherein the predetermined geo-fence area comprises at least one of a geographic location, geographic region, and geographic boundary that geographically define locations where cellular device transmission is one of enabled and controlled one of enabled and controlled.

14. The system of claim 1, further comprising:
a user-defined rules software application within the wireless processing unit, the user-defined rules software application configured to check a set of user-defined rules and trigger an episode at a time when a set of user-defined rules indicate cellular device transmission is one of enabled and controlled.

15. The system of claim 14, wherein the user-defined rules are defined by at least one of regulatory requirements, statutory requirements, government requirements, business requirements, operational requirements, and safety requirements.

16. The system of claim 1, wherein the cellular device transmission detector is one of an internal component and an external component of the wireless processing unit.

* * * * *

UNITED STATES PATENT AND TRADEMARK OFFICE
CERTIFICATE OF CORRECTION

PATENT NO. : 9,913,087 B2  
APPLICATION NO. : 15/473870  
DATED : March 6, 2018  
INVENTOR(S) : Lawrence B. Jordan et al.

Page 1 of 1

It is certified that error appears in the above-identified patent and that said Letters Patent is hereby corrected as shown below:

In the Claims

Column 6 (Line 45) In Claim 1 at Line 14, "a wireless processing unit onboard the mobile asset, the" should be --the--.

Signed and Sealed this
Fourth Day of February, 2020

Andrei Iancu
*Director of the United States Patent and Trademark Office*